| (12) | United States Patent | (10) Patent No.: US 10,442,157 B2 |
|---|---|---|
| | Li et al. | (45) Date of Patent: Oct. 15, 2019 |

(54) HIGH-ELASTICITY POLYURETHANE MATERIAL

(71) Applicants: Chenwen Li, Beijing (CN); Shitu Zhao, Hebei (CN); Mingang Li, Hebei (CN)

(72) Inventors: Chenwen Li, Beijing (CN); Shitu Zhao, Hebei (CN); Mingang Li, Hebei (CN)

( * ) Notice: Subject to any disclaimer, the term of this patent is extended or adjusted under 35 U.S.C. 154(b) by 196 days.

(21) Appl. No.: 15/470,183

(22) Filed: Mar. 27, 2017

(65) Prior Publication Data

US 2018/0271191 A1    Sep. 27, 2018

(51) Int. Cl.
| C08G 18/48 | (2006.01) |
|---|---|
| B32B 7/02 | (2019.01) |
| A41D 19/00 | (2006.01) |
| C08G 18/66 | (2006.01) |
| C08G 18/72 | (2006.01) |
| C08G 18/73 | (2006.01) |
| C08G 18/75 | (2006.01) |
| C08G 18/08 | (2006.01) |
| C08G 18/10 | (2006.01) |
| C08G 18/24 | (2006.01) |
| C08G 18/34 | (2006.01) |

(52) U.S. Cl.
CPC ............ *B32B 7/02* (2013.01); *A41D 19/0058* (2013.01); *C08G 18/0823* (2013.01); *C08G 18/10* (2013.01); *C08G 18/244* (2013.01); *C08G 18/348* (2013.01); *C08G 18/4812* (2013.01); *C08G 18/4825* (2013.01); *C08G 18/4829* (2013.01); *C08G 18/6692* (2013.01); *C08G 18/722* (2013.01); *C08G 18/73* (2013.01); *C08G 18/755* (2013.01)

(58) Field of Classification Search
CPC ............ A41D 19/015; A41D 19/01558; A41D 2400/34; A41D 2400/44; A41D 2400/52; B32B 7/02; C08G 18/482
See application file for complete search history.

(56) References Cited

U.S. PATENT DOCUMENTS

| 5,084,514 A | 1/1992 | Szczechura et al. |
|---|---|---|
| 7,378,043 B2 | 5/2008 | Hassan et al. |
| 8,431,648 B2 * | 4/2013 | Xia .................... C08G 18/0823 428/160 |
| 8,522,363 B2 | 9/2013 | Hassan et al. |
| 8,722,752 B2 * | 5/2014 | Kuwamura ............. B29C 41/18 521/170 |

FOREIGN PATENT DOCUMENTS

CN    106188477    * 12/2016

* cited by examiner

*Primary Examiner* — John M Cooney
(74) *Attorney, Agent, or Firm* — Vincent G. LoTempio; Kloss, Stenger & LoTempio; David T. Stephenson

(57) ABSTRACT

A method and composition for preparation of a high-elasticity polyurethane glove material and glove. The method for practicing the invention generally includes the steps of preparing an ultra-high molecular weight polyol, preparing a high-elasticity polyurethane glove material, and preparing a glove by dipping and forming. A high molecular weight polyether polyol is used in conjunction with polyurethane to increase resilience to a degree comparable with rubber material. Conventional polyurethane materials lack flexibility and do not allow for significant elongation or rebound. The material of the present disclosure may be used for medical applications and modifies polyurethane material to achieve properties similar to rubber materials. The polyurethane material resulting from the method according to the present disclosure has excellent biocompatibility and may be widely used in the medical field. The overall performance of the glove of the present disclosure improved over natural latex gloves or nitrile gloves.

19 Claims, No Drawings

HIGH-ELASTICITY POLYURETHANE MATERIAL

FIELD

The disclosure relates to a preparation method of a high-elasticity polyurethane glove material and belongs to the field of polymer materials.

RELATED ART

Currently, protective gloves are used in industries including food services, health care, and electronics. Such industries require a high level of performance from protective gloves, a need which is not satisfactorily met by existing products. Conventional gloves comprised of materials such as natural rubber, PVC, nitrile, polyethylene gloves do not meet the needs of consumers. A degree of flexibility is needed that existing gloves that may be comprised of polyethylene and PVC slightly better strength and elasticity, can be applied to simple hand protection.

Currently, high quality elastic gloves are comprised of latex and nitrile; however, gloves comprised of latex and nitrile have undesirable qualities. For example, natural latex may cause allergic reactions in some individuals. Due to the potential for causing allergic reactions, latex-containing gloves are often replaced by gloves comprised entirely of nitrile. Nitrile gloves, which generally perform better than natural latex-containing gloves also come with undesirable properties. For example, nitrile gloves contain sulfur and are easily broken, thereby limiting their effectiveness.

Polymer blends that include materials such as nitrile and polyurethane are known in the field. The synthesis of polyurethane by the simultaneous reaction of hydroxyl-terminated polybutadiene, toluene and the cross linker 1, 1, 1 is known—trimethylolpropane in solution nitrile-butadiene rubber, sulfur and filler (Desai, S.; et al: . . . J. Macromol Be 2001 38 71 1-729).

Also known in the art is the preparation of mixtures of selbst synthetisierten polyurethane ionomers and nitrile-butadiene rubber by a melt mixing process. Here, the blends are vulcanized with Schwefelvernetzung and simultaneously crosslinked by triisocyanate (Dimitrievski, I.: Adv. Poly. Blends & Alloys, 1993, from 4.19 to 29).

Existing patents, including CN103549686A, CN1759778A, CN101036535A, CN103564892A, CN102599660A, CN101028742A, CN201414445U and CN1513903A, relate to the composition and manufacture of protective gloves, however, none of these patents result in a glove having the advantageous properties of both natural latex and nitrile gloves.

Therefore, development of a non-sulfur containing glove having the functional properties of both natural latex and nitrile is highly desirable.

SUMMARY

The present disclosure relates to a method for the preparation of a high-elasticity polyurethane glove material and glove. The process for practicing the invention generally includes the steps of 1) preparing an ultra-high molecular weight polyol, 2) preparing a high-elasticity polyurethane glove material, and 3) preparing a glove by dipping and forming. A high molecular weight polyether polyol is used in conjunction with polyurethane to increase the resilience of the polyurethane material to a degree comparable with that of rubber material. Therefore, the material comprising the protective glove is herein referred to as a high-elasticity polyurethane glove material, used typically in manufacturing gloves, although the high-elasticity polyurethane glove material may be used for any purpose to which it may be suited and is not limited to use in gloves. Conventional polyurethane materials lack flexibility and do not allow for significant elongation or rebound. High-elasticity polyurethane gloves, which may be used for medical applications, modify polyurethane material such that the material has the ability to rebound and its elasticity is similar to that of rubber materials.

The method used in the present disclosure includes preparation of a functional ultra-high molecular weight polyol is used obtain the high-elasticity polyurethane glove material. The polyurethane material created according to the present disclosure has excellent biocompatibility and is widely used in the medical field; therefore the high-elasticity polyurethane gloves produced by the process of the present disclosure can be used in medical applications. The overall performance of the glove of the present disclosure is better than that of natural latex gloves or nitrile gloves, and therefore should supplant the use of conventional gloves in medical applications.

DETAILED DESCRIPTION

It is to be understood that this disclosure is not limited to particular embodiments or examples, which may vary. It is also to be understood that the terminology used herein is for the purpose of describing particular embodiments only, and is not intended to be limiting. Further, all publications referred to herein are incorporated by reference herein for the purpose cited to the same extent as if each was specifically and individually indicated to be incorporated by reference herein. In the present disclosure all percentages are calculated by weight (wt %). Reference to parts refers to parts by weight.

The composition and method of the present disclosure involve preparation of a functional ultra-high molecular weight polyol, followed by preparation of a high-elasticity polyurethane glove material. A high-elasticity polyurethane glove is then produced by a dipping and forming process described hereinbelow.

The first step in the process of the present disclosure involves synthesis of high molecular weight material. A functional ultra-high molecular weight polyol of the present disclosure is generated with the use of polyether polyols. Polyether polyols of the process of the present disclosure may have an average molecular weight that generally ranges from 400 to 8,000. Typically, polyol products used in the present disclosure have molecular weights of 2,000, 3,000, 4,800, 6,000 and 8,000, although, at the high end, the range of molecular weight polyol products may be 20,000. A first step in the process of the present disclosure is heating the polyether glycol starter to a temperature of between 110° C. and 120° C. to remove water for between 1.5 to 2 hours, and then reducing the temperature to between 40° C. and 50° C.

A next step involves adding an isocyanate to the polyethylene diol in a metered ratio.

A catalyst is then added and the reaction is stirred at between 80° C. and 85° C. preferably for between three to five hours to obtain a macromolecular polyurethane pre-polymer. The material for producing the macromolecular polyurethane pre-polymer is shown in table 1.

TABLE 1

| Name | Specification | Qty (parts) |
| --- | --- | --- |
| Polyether glycol | Mn = 3000 | 72-96 |
| Isophorone diisocyanate | 99% | 3-18 |
| Catalyst | T9 | 0.01-3 |

The macromolecular polyurethane pre-polymer of the present disclosure may be formed through a polymerization reaction between a polyether diol and polyisocyanate. Termination, or blocking, of the polymerization reaction is achieved with a polyfunctional polyether polyol. This should be a cross-linking agent, thereby creating a more complex structure to improve the strength of the material. The blocking agent is added in the amount of approximately between 1 and 3%. The hydroxyl end of the molecular chain is then end-capped.

The hydroxyl average functionality of the resulting product is not less than 4. The average molecular weight of the resulting functional ultra-high molecular weight polyol weight polyol may be between 35,000 and 100,000.

The process of the present disclosure includes the steps of heating polyether glycol at a temperature between 110° C. to 120° C. for 1.5 to 2 hours, followed by cooling to 40° C. to 50° C. This initial heating step is followed by adding polyisocyanate to the polyether glycol in a metered ratio. A reaction is then carried out in the presence of a catalyst at 80° C. to 85° C. for between 3 to 5 hours to obtain a pre-polymer.

To terminate the reaction, a blocking agent is added. The resulting product is a polyfunctional high molecular weight polyol (which may also be referred to alternatively as a high molecular weight rebound agent or high molecular weight resilient). End-capping of the functional ultra-high molecular weight polyol may be accomplished by addition of one of polyether tetraol, polyether pentaol, polyether hexaol or equivalent compounds, which may have a molecular weight of between 200 and 10,000. The chemical reaction relating to the process of the present disclosure is shown herein below.

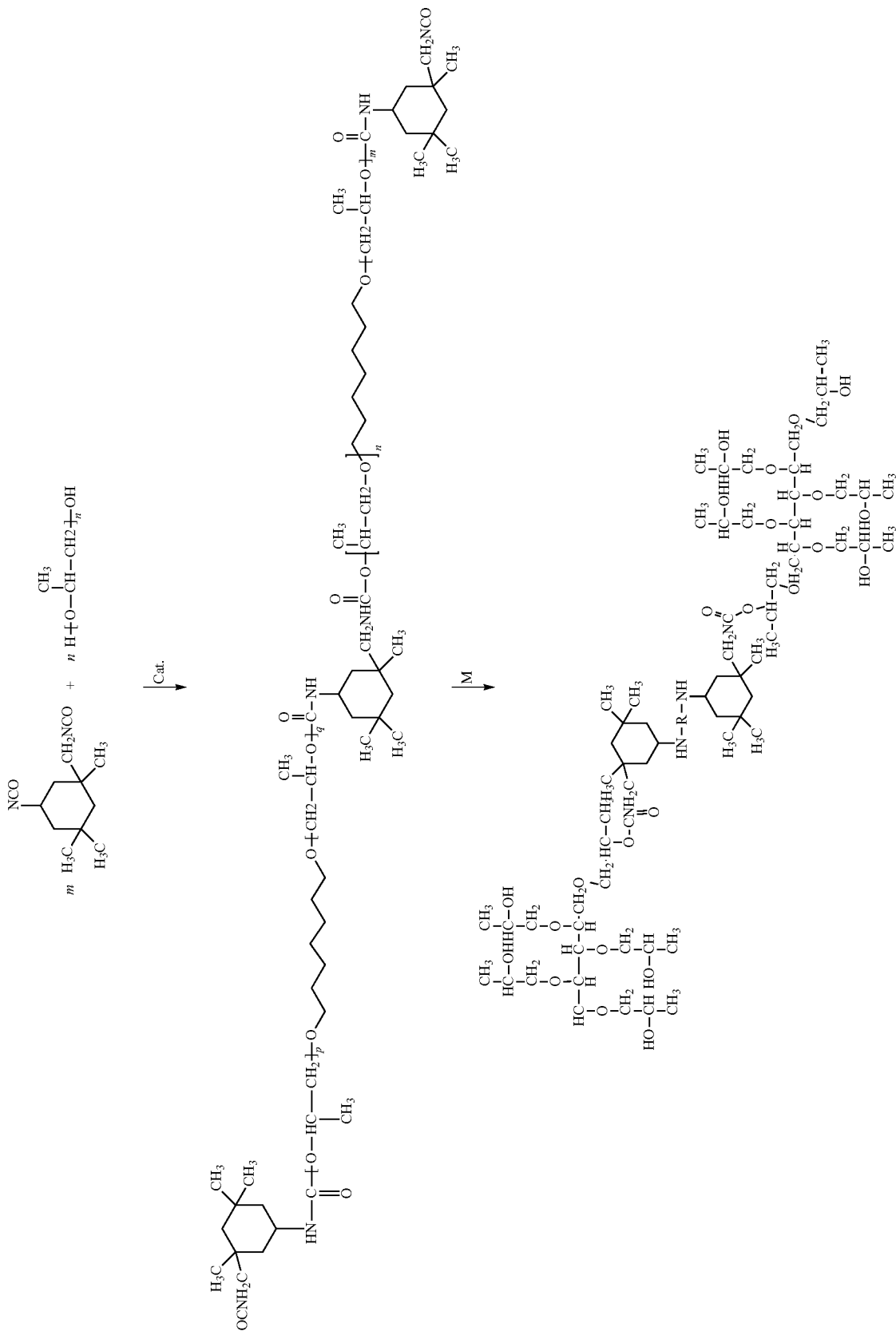

To produce the high-elasticity medical polyurethane glove material a polyether diol was mixed with the functional ultra-high molecular weight polyol to form a soft segment component in the polyurethane segment with a dihydric alcohol containing a hydrophilic group. An aliphatic diisocyanate forms the hard segment component. The hard segment component and a chain extender are fully mixed to obtain a high-elasticity polyurethane glove material.

Polyether diols may be mixed with the functional ultra-high molecular weight polyol in a ratio of 10:0 to 5:5, preferably in a ratio of 7:3 to 5:5, and particularly preferably in a ratio of 3:2 to 1:1

Anionic self-emulsifiable polyurethane emulsions are then introduced in the chain due to molecular ion groups. Carboxy, sulfonate or sulfate, or carboxyl group-containing diols such as dimethylol propionic acid (of DMPA), may be used in an amount of 0.5 to 20%. These compounds are optimally used between 2 and 12%.

Chain extenders used in the present disclosure may be diamines, such as ethylenediamine, which may be added in a range of between 1 and 10%, and more preferably between 3 and 7%. In some embodiments, between 1 and 2% wetting agent may be added. In some embodiments, a defoamer (defoamer may be DF-60, Tianjin Sai Fei Chemical Technology Development Co., Ltd. LLC or an organic defoamer as would be known to one of ordinary skill in the art) may be added at between 1 and 2%. The polyether polyol may have a molecular weight of between 500-5000 and a more preferred molecular weight of between 500-3500.

Diisocyanate may be added in an amount of 3 to 8%, preferably 4 to 6%. (HMDI), hexamethylene diisocyanate (HDI), isophorone diisocyanate (IPDI) or a mixture thereof may be used, and the diisocyanate is preferably selected from the group consisting of diisocyanates, hexamethylene diisocyanate (HDI), isophorone diisocyanate (IPDI), or a mixture thereof.

To produce the glove, the high-elasticity medical polyurethane glove material may be combined with a surfactant and deionized water. The glove may be prepared by combining between 10 and 40 parts high-elasticity polyurethane glove material, between 10 and 40 parts surfactant, and between 20 and 80 parts deionized water.

EXAMPLES

Example 1

Components used in formation of a macromolecular polyurethane pre-polymer are shown in Table 1. For generation of a functional ultra-high molecular weight polyol, 511.55 g of polyoxyalkylene ether glycol PPG (molecular weight 3000) was added to a three-necked flask equipped with a stirrer and heated. The polyoxyalkylene ether glycol PPG was heated to 110° C., at which point vacuum dewatering was carried out at a vacuum pressure of between 0.095 and 0.1 MPa and temperature of between 110° C. to 120° C. for between 1.5 and 2 hours. 20.84 g of isophorone diisocyanate (IPDI) was then added dropwise to the mixture and the temperature was lowered to 40° C. to 50° C. After dropwise addition of the IPDI was completed, the mixture was held at 85° C. for a 1 hour reaction time.

T9 (stannous octoate) catalyst in the amount of 5.40 g was then added to the mixture. The mixture was then allowed to react at 85° C. under the action of the catalyst reaction for between 2 and 3 hours to form the macromolecular polyurethane pre-polymer.

During the reaction process a small amount of sampling reaction was taken from the mixture every 15 min and an NCO mass fraction was measured until the NCO group mass fraction reached the theoretical value (0.13%) of the design.

Next, termination agent is added, which may be a hard polyether polyol, having a hydroxyl value of 360-400 mg KOH/g, water content of <0.2%, pH of 9-12 and viscosity of 9000-13000 MPa/25° C. Termination was followed by addition of an end-capping agent which may be a high-functionality polyether polyol such as polyether tetraol, polyether pentaol, polyether hexaol and the like, having a molecular weight of between 200 and 10,000.

The hydroxyl value of the mixture was measured at 15 minute intervals until the hydroxyl value reached the designed theoretical value (8.69 mg KOH/g).

Example 2

With regard to the synthesis of high-elasticity polyurethane glove material, Table 2 shows data on performance of the material generated by the process of the present disclosure when produced using various ratios of polyether diols and functional ultra-high molecular weight polyol. The parameters tested include body stress and permanent deformation.

Table 2, A-F, shows varying amounts of functional ultra-high molecular weight polyol mixed with a polyether diol in a ratio of between 10:0 and 5:5, when combined with a hydrophilic group-containing diol to form polyurethane. The polyether polyol, here, had a molecular weight of approximately 3000.

In Table 2, properties of the material produced by the present disclosure are compared. The ratio of polyether diols to functional ultra-high molecular weight polyol is shown, along with performance of the resulting material, in rows A-F of Table 2. The ratio of hexamethylene diisocyanate (HDI) and isophorone diisocyanate (IPDI) was 1:1, and dimethylolpropionic acid (DMP) content was 6% in the diisocyanate. The chain extender used was ethylenediamine at 5%. Next, a 1% wetting agent (an organic wetting agent as would be known to one of skill in the art may be used) was added, followed by a 1% defoamer. The mixture was then fully mixed to generate a high-elasticity polyurethane glove material.

Polyoxypropylene ether glycol PPG (molecular weight of 3000, from Shandong Blue Star East Large Industrial, LLC) was used in example 2. DD-380A (Polyhexaerhol, produced by Shandong Lansing Dongda Industry Co., Ltd.) was used in example 2.

TABLE 2

| | Polyether diols:functional ultra-high molecular weight polyol | 300% set body stress (MPa) | Permanent deformation (%) |
|---|---|---|---|
| A | 10:0 | 37 | 35 |
| B | 9:1 | 39 | 12 |
| C | 8:2 | 40 | 10 |
| D | 7:3 | 41 | 7 |
| E | 6:4 | 41 | 5 |
| F | 5:5 | 41 | 5 |

Example 3

Example 3 describes the preparation of polyurethane medical gloves according to one embodiment of the present disclosure. In example 3, 20 parts high-elasticity polyurethane glove material was combined with 20 parts of surfactant in a flask (6 parts of polyether diol plus 4 parts of high molecular weight resilient to produce 20 parts of high elastic polyurethane material, and 20 parts of surfactant were added into the flask). The mixture was then heated to 50° C. After the mixture was completely combined, the temperature of the mixture was controlled at 60° C. Deionized water was then added at 0.1 m per minute for 2 hours. The mixture was then heated at between 60☐ and 80☐ for 3 hours to obtain milky white polyurethane glove emulsion.

To mold the polyurethane medical gloves, a glove mold was immersed in a coagulant, which may preferably be calcium nitrate, and dried. The glove mold was then immersed in the polyurethane glove emulsion at a temperature of 45° C. for 40 seconds in the emulsion, followed by drying at 100° C. for 15 minutes and then crimping and releasing and the like, to obtain the product of the present invention. Table 3 shows the performance of the gloves after various irradiation times.

TABLE 3

| Sample | Thickness (mm) | Irradiation Time (hours) | Tensile Strength (MPa) | Elongation at Break (%) | Stress Relaxation (%) | 300% Modulus (MPa) |
|---|---|---|---|---|---|---|
| 1 | 0.08 | 0 | 65 | 757 | 60 | 2.1 |
| 2 | 0.08 | 5 | 66 | 755 | 60 | 2.3 |
| 3 | 0.08 | 20 | 64 | 760 | 60 | 2.0 |

The results shown in table 3 demonstrate that the irradiation time on the glove did not significantly change the performance, stress relaxation and 300% modulus of the surface, the polyurethane medical gloves with latex gloves softness, and higher mechanical properties of polyurethane gloves of the present disclosure. Example 3 illustrates improved function, with regard to strength and wear resistance, when compared to the known properties of conventional latex and nitrile gloves.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of producing a polyurethane material comprising:
   combining a polyether diol and a polyisocyanate;
   causing an addition polymerization reaction to occur, thereby generating a macromolecular polyurethane pre-polymer;
   terminating the addition polymerization reaction;
   end capping the polymerization reaction product, thereby forming a functional ultra-high molecular weight polyol;
   combining the functional ultra-high molecular weight polyol with a hydrophilic group-containing polyether diol;
   adding a chain extender; and
   generating a high-elasticity polyurethane glove material.

2. The method of claim 1, further comprising adding a catalyst to the polyether diol and the polyisocyanate.

3. The method of claim 2, wherein the catalyst is stannous octoate.

4. The method of claim 1, wherein an average molecular weight of the functional ultra-high molecular weight polyol is between 35,000 and 100,000.

5. The method of claim 1, wherein terminal hydroxyl groups of the functional ultra-high molecular weight polyol have an average hydroxyl functionality of not less than 4.

6. The method of claim 1, wherein terminating the addition polymerization reaction is achieved by adding a blocking agent, wherein said blocking agent is a hard polyether polyol.

7. The method of claim 1, wherein end capping is achieved by addition of a high-functionality polyether polyol.

8. The method of claim 1, wherein the polyether diol and the functional ultra-high molecular weight polyol are mixed in a ratio of between 10 to 0 and 5 to 5, respectively.

9. The method of claim 1, wherein a hydrophilic group-containing diol is added in an amount of between 0.5 and 20%.

10. The method of claim 1, wherein the chain extender is comprised of diamines added in a range of between 1 and 10%.

11. The method of claim 1, wherein a diisocyanate is added in an amount of between 3 and 8%.

12. A method for manufacturing a polyurethane glove emulsion, comprising:
   combining a polyether diol and a polyisocyanate;
   adding a catalyst to promote an addition polymerization reaction, thereby generating a macromolecular polyurethane pre-polymer;
   terminating the addition polymerization reaction;
   end capping a polymerization reaction product, thereby forming a functional ultra-high molecular weight polyol;
   combining the functional ultra-high molecular weight polyol with a hydrophilic group-containing polyether diol;
   adding a chain extender; and
   allowing a reaction to occur in order to generate a high-elasticity polyurethane material;
   combining the high elasticity polyurethane material with a surfactant; and
   adding water to generate an operative high elasticity polyurethane emulsion.

13. The method of claim 12, further comprising combining the high elasticity polyurethane material in a range of between 10 and 40 parts with the surfactant in a range of between 10 and 40 parts;
   adding water in a range of between 20 and 80 parts to generate an operative high elasticity polyurethane emulsion.

14. The method of claim 12, wherein the surfactant is selected from a group consisting of a sulfate of an anionic emulsifier, a sulfonate of an anionic emulsifier, and non-ionic emulsifiers, or a mixture thereof.

15. The method of claim 14, wherein a ratio of the anionic emulsifier to the non-ionic emulsifier is in a range of between 9 to 1 and 1 to 9, respectively.

16. The method of claim 12, further comprising the steps of thoroughly mixing the high elasticity polyurethane material and the surfactant at a temperature of between 40° C. and 80° C.; followed by gradually adding deionized water at a rate of 0.04 to 0.2 per minute, such that a process of adding the deionized water takes between 2 to 4 hours to complete, whereupon the reaction is allowed to occur at between 60 and 80° C. for an insulation mixture for between 2 and 3 hours to generate a milky white emulsion.

17. The method of claim 12, wherein a stress relaxation of a glove is between 60 and 70%, a 300% modulus is less than 3 MPa, a tensile strength is more than 50 MPa and an elongation at break is greater than 700%.

18. A method for manufacturing a polyurethane glove emulsion, comprising:
- combining a polyether diol and a polyisocyanate;
- adding a catalyst to promote an addition polymerization reaction, thereby generating a macromolecular polyurethane pre-polymer;
- terminating the addition polymerization reaction;
- end capping the polymerization reaction product, thereby forming a functional ultra-high molecular weight polyol;
- combining the functional ultra-high molecular weight polyol with a hydrophilic group-containing polyether diol;
- adding a chain extender; and
- allowing a reaction to occur in order to generate a high-elasticity polyurethane glove material;
- combining the high elasticity polyurethane material with a surfactant; and
- adding water to generate an operative high elasticity polyurethane emulsion;
- drying a glove mold impregnated with a coagulating agent;
- immersing the glove mold in the operative high elasticity polyurethane emulsion; removing the glove mold from the operative high elasticity polyurethane emulsion to obtain a coated glove mold;
- drying the coated glove mold; and curling and stripping to produce a glove.

19. The method of claim 18, further comprising immersing the glove mold in the operative high elasticity polyurethane emulsion for between 30 and 60 seconds when a temperature of the operative high elasticity polyurethane emulsion is between 30-50° C. and drying the coated glove mold in an oven for between 10 and 30 minutes at between 80° C. and 110° C.

* * * * *